United States Patent
Lim et al.

(10) Patent No.: US 8,907,584 B2
(45) Date of Patent: Dec. 9, 2014

(54) APPARATUS FOR CONTROLLING CONSTANT CURRENT FOR MULTI-CHANNEL LEDS AND LIQUID CRYSTAL DISPLAY USING THE SAME

(71) Applicant: LG Display Co., Ltd., Seoul (KR)

(72) Inventors: Seongho Lim, Seoul (KR); Eungkyu Kim, Gyeonggi-do (KR); Taewoo Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 272 days.

(21) Appl. No.: 13/671,714

(22) Filed: Nov. 8, 2012

(65) Prior Publication Data
US 2013/0114016 A1 May 9, 2013

(30) Foreign Application Priority Data
Nov. 8, 2011 (KR) .................. 10-2011-0115614

(51) Int. Cl.
*H05B 41/16* (2006.01)

(52) U.S. Cl.
USPC ........ 315/247; 315/291; 315/185 S; 315/224; 315/312

(58) Field of Classification Search
USPC ....... 315/247, 224, 225, 185 S, 291, 307–326
See application file for complete search history.

(56) References Cited

U.S. PATENT DOCUMENTS

| 7,999,484 B2 * | 8/2011 | Jurngwirth et al. ........... 315/247 |
| 8,766,546 B2 * | 7/2014 | Oshima .................... 315/185 R |
| 2007/0013321 A1 * | 1/2007 | Ito et al. ....................... 315/247 |
| 2012/0119677 A1 * | 5/2012 | Serdarevic et al. ........... 315/307 |
| 2012/0181942 A1 * | 7/2012 | Redjebian ..................... 315/210 |

* cited by examiner

*Primary Examiner* — Tuyet Thi Vo
(74) *Attorney, Agent, or Firm* — Morgan, Lewis & Bockius LLP

(57) ABSTRACT

An apparatus for controlling the constant current for multi-channel LEDs includes: a plurality of LED channels each comprising an LED array, a transistor, and a variable emitter resistor; a feedback sensing circuit for sensing the collector or drain voltage of a transistor of each of the LED channels; and a controller for increasing the variable emitter resistance of an LED channel in which the collector voltage of the transistor is higher than those of the other LED channels, in response to a feedback sensing result input from the feedback sensing circuit.

10 Claims, 3 Drawing Sheets

APPARATUS FOR CONTROLLING CONSTANT CURRENT FOR MULTI-CHANNEL LEDS AND LIQUID CRYSTAL DISPLAY USING THE SAME

This application claims the benefit of Korean Patent Application No. 10-2011-0115614 filed on Nov. 8, 2011, which is incorporated herein by reference for all purposes as if fully set forth herein.

BACKGROUND

1. Field

This document relates to an apparatus for controlling the constant current for multi-channel LEDs (Light Emitting Diodes) and a liquid crystal display using the same.

2. Related Art

Since an LED is a current driving element, it is driven by constant current to keep the luminance constant. A plurality of LEDs may be configured in multiple channels and implemented as light sources. Each LED channel comprises an LED array having a plurality of LEDs connected. The LED channels may be commonly connected to a DC-DC converter.

There may be a difference in LED driving voltage, i.e., forward voltage $Vf$, between the LED channels due to a difference between the LEDs. The DC-DC converter generates an output voltage with respect to the LED array of an LED channel with a higher forward voltage $Vf$. To keep the current flowing through the LED channels constant, a transistor connected to the LED array for each channel is controlled to control the constant current flowing through the LED channels. To this end, a voltage equal to or higher than a predetermined reference voltage is set for the base of a transistor provided in each LED channel to control the current flowing through the LED channels.

In a conventional apparatus for controlling constant current for multi-channel LEDs, a voltage higher than a required level may be applied to two ends of a transistor for driving constant current, due to a forward voltage difference between the LED channels. In this case, the transistor needs to be larger in size because it requires high-capacity channel. As a result, transistors of the conventional apparatus for controlling the constant current for multi-channel LEDs are not integrated within an integrated circuit (hereinafter, "IC"), but instead disposed outside the IC.

FIG. 1 is a view showing an example of power consumption for each LED channel in a conventional apparatus for controlling the constant current for multi-channel LEDs.

In the apparatus for controlling the constant current for multi-channel LEDs, as shown in FIG. 1, it is assumed that the forward voltage $Vf1$ of an LED array LED1 of a first LED channel is 9 V, the forward voltage $Vf2$ of an LED array LED2 of a second LED channel is 8 V, and the current $I$ flowing through the LED arrays LED1 and LED2 when transistors Q1 and Q2 are turned on is 0.1 A. In this case, a DC-DC converter (not shown) outputs a voltage of 10 V required to drive the first and second LED channels, with respect to the LED array of the first LED channel with higher forward voltage $Vf1$.

Electric power PLED1 consumed in the LED array LED1 of the first LED channel is "PLED1=9 V×0.1 A=0.9 W". Here, 0.1 W is the minimum electric power which is lost when only a collector-emitter voltage $Vce1$ enabling current control in a linear operating region of the transistor Q1 is used. Since the voltage $Vr1$ of an emitter resistor R1 is fixed to "Vr1=5Ω×0.1 A=0.5 V", the power Pr1 consumed in the emitter resistor R1 is "Pr1=0.5 V×0.1 A=0.05 W". The collector-emitter voltage $Vce1$ of the transistor Q1 is equal to a voltage of 0.5 V, which is obtained by subtracting the forward voltage $Vf1$ of the LED array LED1 and the voltage $Vr1$ of the emitter resistor R1 from the output voltage 10V of the DC-DC converter. Accordingly, since Vec1=0.5 V, the power consumption Pq1 of the transistor Q1 is equal to Pq1=Vce1×I=0.5 A×0.1 A=0.05 W.

As electric power PLED2 consumed in the LED array LED2 of the second LED channel is Vf2=8 V, "PLED2=8V× 0.1 A=0.8 W". Since he voltage vr2 of an emitter resistor R2 is fixed to Vr2=5Ω×0.1 A=0.5 V", the power Pr2 consumed in the emitter resistor R2 is "Pr2=0.5 V×0.1 A=0.05 W". If the reference voltage of the second LED channel is increased to 1.5 V, the collector-emitter voltage $Vce2$ of the transistor Q2 is equal to a voltage of 1.5 V, which is obtained by subtracting the forward voltage $Vf2$ of the LED array LED2 and the voltage $Vr2$ of the emitter resistor R2 from the output voltage 10V of the DC-DC converter. Accordingly, since Vec2=1.5 V, the power consumption Pq2 of the transistor Q2 is equal to Pq2=Vce2×I=1.5 A×0.1 A=0.15 W.

As seen from FIG. 1, the transistor Q2 of the second LED channel has higher power consumption than that Q1 of the first LED channel due to the forward voltage difference between the LED arrays LED1 and LED2, and the amount of heat generation is as much increased. Accordingly, the transistors Q1 and Q2 become larger in size because they need to be manufactured to have such a channel ratio as to withstand as much power consumption as the rated power consumption of the second transistor Q2, and this makes it difficult to integrate the transistors within an IC.

SUMMARY

The present invention has been made in an effort to provide an apparatus for controlling the constant current for multi-channel LEDs, which can reduce the power consumption of transistors and manufacture the transistors to have a size enough to be integrated within an IC.

An apparatus for controlling the constant current for multi-channel LEDs according to the present invention comprises: a plurality of LED channels each comprising an LED array, a transistor, and a variable emitter resistor; a feedback sensing circuit for sensing the collector or drain voltage of a transistor of each of the LED channels; and a controller for increasing the variable emitter resistance of an LED channel in which the collector voltage of the transistor is higher than those of the other LED channels, in response to a feedback sensing result input from the feedback sensing circuit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
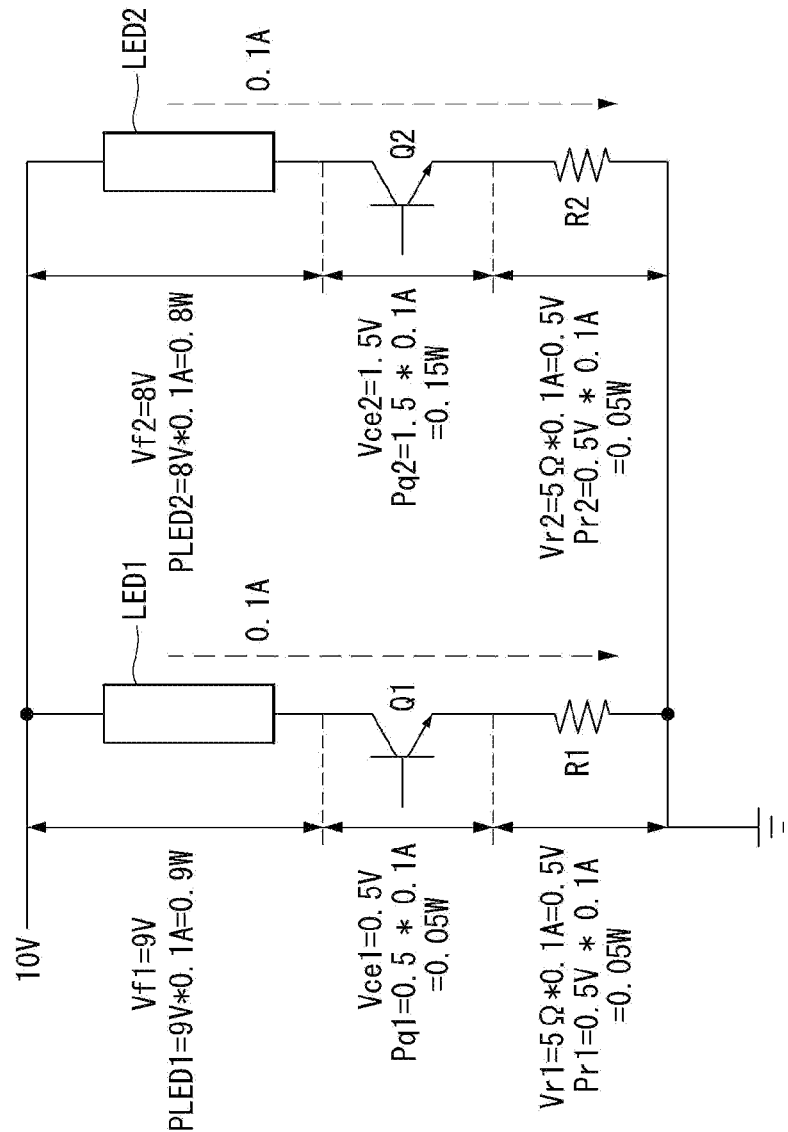
FIG. 1 is a view showing an example of power consumption for each LED channel in a conventional apparatus for controlling the constant current for multi-channel LEDs.

Hereinafter, exemplary embodiments of the present invention will be described with reference to the drawings.

Throughout the specification, like reference numerals denote substantially like components. In the following description, if it is decided that the detailed description of known function or configuration related to the invention makes the subject matter of the invention unclear, the detailed description is omitted.

Figure 2:
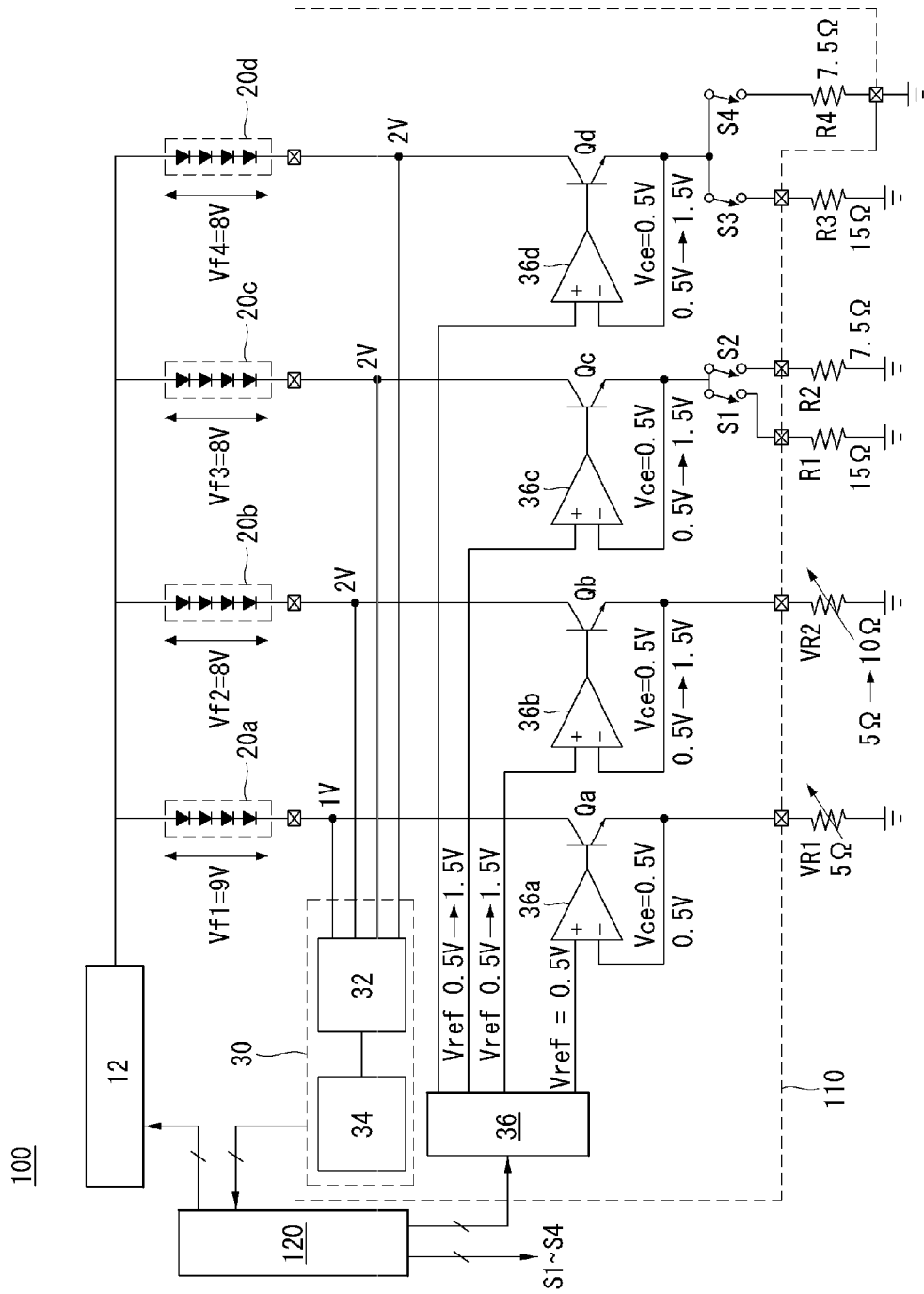
FIG. 2 is a block diagram showing an apparatus for controlling the constant current for multi-channel LEDs according to an exemplary embodiment of the present invention.

Referring to FIG. 2, an apparatus 100 for controlling the constant current for multi-channel LEDs according to an exemplary embodiment of the present invention comprises a plurality of LED channels, a DC-DC converter 12 for generating a voltage required to drive the plurality of LED channels, and transistors Qa to Qd integrated within an IC 110. The transistors Qa to Qd may be implemented as transistor devices such as BJTs (Bipolar Junction Transistors) or FETs (Field Effect Transistors).

Although FIG. 2 illustrates the LED channels as four LED channels comprising first to fourth LED channels, the present invention is not limited thereto. For example, the number of LED channels comprises N (N is a positive integer equal to or greater than 2) LED channels.

The first LED channel comprises a first LED array 20a, the first transistor Qa, a first variable emitter resistor VR1, and a first comparator 36a. The second LED channel comprises a second LED array 20b, the second transistor Qb, a second variable emitter resistor VR1, and a second comparator 36a. The third LED channel comprises a third LED array 20c, the third transistor Qc, a plurality of emitter resistors R1 and R2, and a plurality of switching elements S1 and S2. The fourth LED channel comprises a fourth LED array 20d, the fourth transistor Qd, a plurality of emitter resistors R3 and R4, and a plurality of switching elements S3 and S4. The variable resistors VR1 and VR2 of the first and second LED channels may be implemented by a combination of the resistors and switching elements of the third and fourth LED channels. Each of the LED arrays 20a to 20d may comprise a plurality of LEDs connected in series as shown in FIG. 2, but the present invention is not limited thereto and each LED array may comprise LEDs connected in series/parallel.

Each of the comparators 36a to 36d is implemented as an operational amplifier comprising a non-inverting input terminal (+) to which a reference voltage Vref is supplied, an inverting input terminal (−) connected to emitter terminals (or source terminals) of the transistors Qa to Qd, and an output terminal connected to based terminals (or gate terminals) of the transistors Qa to Qd. The comparators 36a to 36d control the base voltages of the transistors Qa to Qd so as to keep the current flowing through the LED channels constant in accordance with the reference voltage Vref.

An output terminal of the DC-DC converter 12 is commonly connected to the LED arrays of the LED channels to supply an output voltage of anodes of the LED arrays 20a and 20b.

The DC-DC converter 12 generates an output voltage higher than the highest voltage among the forward voltages Vf1 to Vf4 of the first to fourth LED arrays 20a to 20d under control of a controller 120. For example, if the forward voltages Vf1 to Vf4 of the first to fourth LED arrays 20a to 20d are as shown in FIG. 2, the DC-DC converter 12 may output a voltage of 10V with respect to the first LED array 20a with highest forward voltage.

The multi-channel LED constant current controlling apparatus 100 of the present invention further comprises a feedback sensing circuit 30, a controller 120, and a transistor controller 36.

The feedback sensing circuit 30 senses the collector (or drain) voltage of each of the transistors Qa to Qd in a time-division manner and supplies it to the controller 120. To this end, the feedback sensing circuit 30 comprises a multiplexer 32 for time-divisionally outputting the collector voltage (or drain voltage) of each of the transistors Qa to Qd under control of the controller 120 and an ADC (analog-to-digital converter) 34 for converting the output voltage of the multiplexer (MUX) 32 into digital data.

The transistor controller 36 supplies the reference voltage Vref to the comparators 36a to 36d so as to allow for feedback control for controlling the output voltage of the DC-DC converter 12. The transistor controller 36 adjusts the reference voltage Vref under control of the controller 120.

The controller 120 controls the reference voltage Vref for each LED channel so as to keep the current I flowing through the LED channels constant by controlling an operation timing of the feedback sensing circuit 30 and analyzing the feedback voltage of each of the LED channels. Moreover, the controller 120 changes the resistance values of the variable resistors in order to reduce the power consumption of the transistors Qa to Qd of the LED channels. To this end, the controller 120 may generate switch control signals for controlling the ON/OFF of the switching elements S1 to s4.

Hereinafter, an operation of the multi-channel LED constant current controlling apparatus 100 according to the present invention will be described in detail with reference to FIG. 2.

It is assumed that the forward voltage Vf1 required for the LED array 20a of the first LED channel is 9 V, the forward voltages Vf2 to Vf4 required for the LED arrays 20b to 20d of the second to fourth LED channels is 8 V, and the constant current I flowing through the LED arrays 20b to 20d when the transistors Qa to Qd are turned on is 0.1 A. Also, the DC-DC converter 12 outputs a voltage of 10V with respect to the LED array of the first LED channel with highest forward voltage.

Immediately after initializing the multi-channel LED constant current controlling apparatus 100, the transistor controller 36 outputs a reference voltage Vref of 0.5 V set as a default voltage under control of the controller 120, and the DC-DC converter 12 generates an output voltage of 10 V. Then, the base voltages the transistors Qa to Qd rise up to the reference voltage Vref to turn on the transistors Qa to Qd. At this point, the feedback sensing circuit 30 senses the collector voltages of the transistors Qa to Qd and supplies them to the controller 120. Due to the forward voltage difference between the LED arrays 20a to 20d, the collector voltage of the first transistor Qa is sensed as 2 V, whereas the collector voltage of each of the second to fourth transistors Qb to Qd is sensed as 1 V.

The controller 120 increases the reference voltage Vref to keep the current constant in the second to fourth LED channels in which the collector voltages of the transistors are higher than a predetermined voltage, and increases the emitter resistance values, thereby suppressing an increase in the power consumption of the transistors Qb to Qd. The predetermined voltage may be set to 1 V which is twice as high as the default reference voltage Vref. If the collector voltages of the transistors are higher than the predetermined voltage, the controller 120 controls the reference voltage Vref to be further increased as the collector voltages of the transistors become higher. In FIG. 2, in response to a result of sensing the collector voltages of the transistors, the controller 120 keeps the reference voltage of the first LED channel at 1V, and keeps the resistance value of the first variable emitter resistor VR1 to 5Ω. On the other hand, in response to a result of sensing the collector voltages of the transistors, the controller 120 increases the reference voltage of each of the second to fourth LED channels to 1.5 V.

The power consumption of the first LED 20a is 0.9 W as in the first LED channel of FIG. 1, and the power consumption of each of the second to fourth LED arrays 20b to 20d is 0.8 W as in the second LED channel of FIG. 1.

Electric power consumed in the transistor Qa and first variable emitter resistor VR1 of the first LED channel is 0.1 W. Since the resistance value of the first variable emitter resistor VR1 is 5Ω, the power consumption of the first variable emitter resistor VR1 is 0.05 W as shown in FIG. 1. The collector-emitter voltage Vce1 of the first transistor Qa is equal to a voltage of 0.5 V, which is obtained by subtracting the forward voltage of the first LED array 20a and the voltage of both ends of the first variable emitter resistor VR1 from the output voltage 10V of the DC-DC converter 12. Accordingly, since Vec1=0.5 V, the power consumption Pq1 of the transistor Q1 is equal to Pa1=Vce1×I=0.5 A×0.1 A=0.05 W. The collector-emitter voltage Vce1 of the first transistor Qa is equal to a drain-source voltage of an FET.

In response to a result of sensing the collector voltages of the transistors of the second to fourth LED channels, the controller 120 increases the reference voltage Vref of each of the second to fourth LED channels to 1.5 V, and increases the emitter resistance value from the default resistance value 5Ω to 15Ω. In this case, the voltage Vr2 of the second variable emitter resistor VR2 increases to "Vr2=15 Ω×0.1 A=1.5 V", and the power consumption Pr2 thereof is "Pr2=1.5 V×0.1 A=0.15 W". The collector-emitter voltage Vce2 of the transistor Qb is equal to a voltage of 0.5 V, which is obtained by subtracting the forward voltage 8V of the second LED array 20b and the voltage 1.5 V of the second variable emitter resistor VR2 from the output voltage 10V of the DC-DC converter 12. Accordingly, since the resistance value of the second variable emitter resistor VR2 is increased, the power consumption Pq2 of the second transistor Qb is decreased to Pq2=Vce2×I=0.5 A×0.1 A=0.05 W.

As discussed above, the variable emitter resistors VR1 and VR2 may be implemented by a combination of the switching elements S1 to S4 and first and second resistors R1 and R2, as in the third and fourth LED channels. The resistance value of the first resistor R1 may be set to 15Ω, and the resistance value of the second resistor R2 may be set to 7.5Ω. The controller 120 increases the reference voltage of an LED channel with a relatively low forward voltage, for example, the third LED channel, and turns on the first switching element S1 to increase the resistance value of the emitter resistors to 15Ω. On the other hand, if the collector voltage of the transistor Qc is equal to or lower than a predetermined voltage, the controller 120 keeps the reference voltage at the default value, and turns on both the first and second switching elements S1 and S2 to control the resistance value of the emitter resistors to have 5V which is a parallel resistance value of the first and second resistors.

The resistors R1 to R4 may be disposed outside the IC 110 as the resistors R1 and R2 connected to the third LED channel are in FIG. 2. In another example, one or more of the resistors R1 to R4 may be integrated within the IC 110, along with other elements, as the fourth resistor R4 connected to the fourth LED channel is.

The first and second switching elements S1 and S2 of the third LED channel are connected in parallel to the emitter terminal of the third transistor Qc. The first resistor R1 is connected between the first switching element S1 and a ground voltage source GND. The second resistor R2 is connected between the second switching element S2 and the ground voltage source GND. Likewise, the third and fourth switching elements S3 and S4 of the fourth LED channel are connected in parallel to the emitter terminal of the fourth transistor Qd. The third resistor R3 is connected between the third switching element S3 and the ground voltage source GND. The fourth resistor R4 is connected between the fourth switching element S4 and the ground voltage source GND.

In response to a feedback sensing result input from the feedback sensing circuit 30, the controller 120 turns on both of the switching elements S1 and S2 (or S3 and S4) of an LED channel in which the collector voltage of the transistor is lower than those in the other LED channels, so that the resistors R1 and R2 (or R3 and R4) are connected in parallel. Accordingly, the emitter resistance value is lower in an LED channel with a higher forward voltage.

In response to a feedback sensing result input from the feedback sensing circuit 30, the controller 120 turns on either one of the switching elements S1 and S2 (or S3 and S4) of an LED channel in which the collector voltage of the transistor is higher than those of the other LED channels, so that either one of the resistors R1 and R2 (or R3 and R4) is connected in series to the emitter terminal of the transistor. Accordingly, the emitter resistance value is higher in an LED channel with a lower forward voltage.

Figure 3:
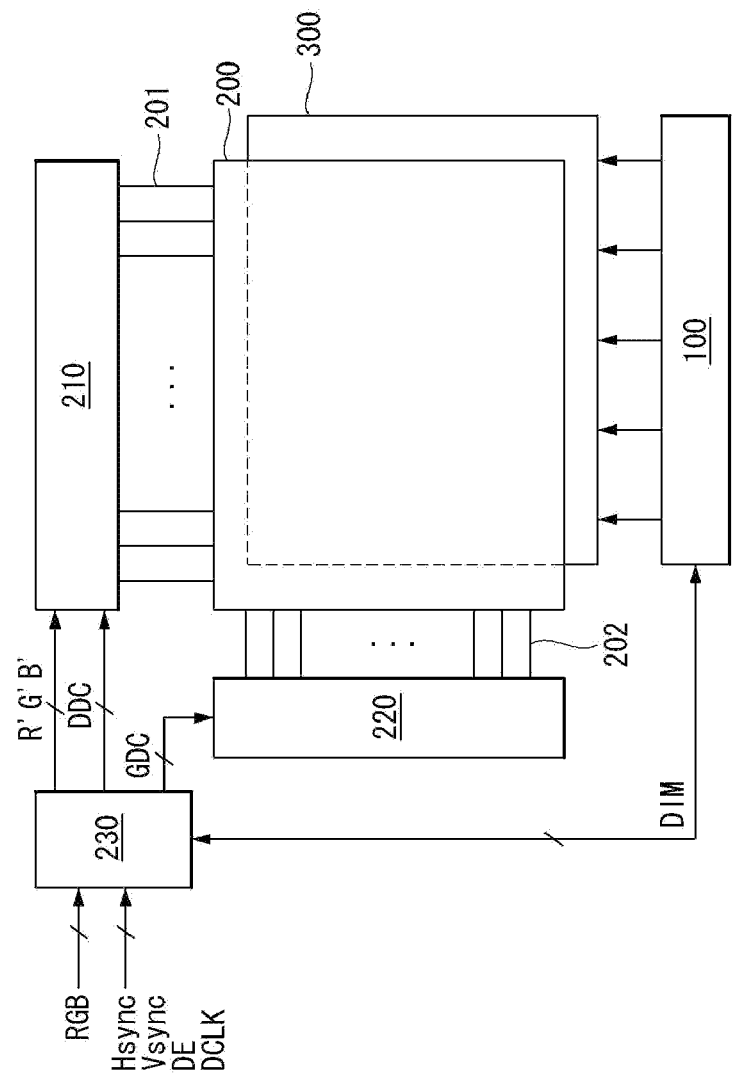
FIG. 3 is a block diagram showing a liquid crystal display according to an exemplary embodiment of the present invention.

As shown in FIG. 3, the multi-channel LED constant current controlling apparatus 100 according to the present invention may be applied to a backlight unit of a liquid crystal display.

Referring to FIG. 7, a liquid crystal display of the present invention comprises a liquid crystal display panel 200, a source driver 210 for driving data lines 201 of the liquid crystal display panel 200, a gate driver 220 for driving gate lines 202 of the liquid crystal display panel 200, a timing controller 230 for controlling the source driver 210 and the gate driver 220, a backlight unit 300 for irradiating light to the liquid crystal display panel 200, and the multi-channel LED constant current controlling apparatus 100 for driving light sources of the backlight unit 300.

The liquid crystal display panel 200 has a liquid crystal layer formed between two glass substrates. In the liquid crystal display panel 200, liquid crystal cells are arranged in a matrix form according to an intersection structure of the data lines 201 and the gate lines 202. A thin film transistor (hereinafter, "TFT") array substrate of the liquid crystal display panel 200 comprises the data lines 201, gate lines 202, TFTs, pixel electrodes of liquid crystal cells connected to the TFTs and storage capacitors, which are formed thereon. A color filter substrate of the liquid crystal display panel 200 comprises a black matrix, a color filter, and a common electrode, which are formed thereon. The liquid crystal display panel 200 may be implemented in a vertical field driving mode, such as a twisted nematic (TN) mode and vertical alignment (VA) mode, a horizontal field driving mode such as an in-plane switching (IPS) mode and a fringe field switching (FFs) mode, or any well-known liquid crystal mode.

The timing controller 230 receives timing signals Vsync, Hsync, DE and DCLK from an external host system, and supplies digital video data RGB to the source driver 210. The timing signals Vsync, Hsync, DE, and DCLK comprise a vertical synchronization signal Vsync, a horizontal synchronization signal Hsync, a data enable signal DE, and a dot clock signal DCLK. The timing controller 230 generates timing control signals DDC and GDC for controlling operation timings of the source driver 210 and the gate driver 220 on the basis of the timing signals Vsync, Hsync, DE, and DCLK from the host system. The timing controller 230 may modulate the digital video data RGB received from the host system by a picture quality compensation algorithm, and supply the modulated digital video data R'G'B' to the source driver 210.

The host system is implemented as any of the following: a navigation system, a set-top box, a DVD player, a Blue-ray player, a personal computer (PC), a home theater system, a broadcast receiver, and a phone system. The host system comprises an SoC (System on chip) having a scaler incorporated therein to transmit a timing signal, along with input image data, to the timing controller 230.

The source driver 210 latches the digital video data R'G'B' under control of the timing controller 230. In addition, the source driver 210 converts the digital video data R'G'B' into a positive/negative analog data voltage using a positive/negative gamma compensation voltage, and supplies the positive/negative analog data voltage to the data lines 201. The gate driver 220 sequentially supplies gate pulses (or scan pulses) synchronized with the data voltage on the data lines 201 to the gate lines 202.

The backlight unit 300 is arranged under the liquid crystal display panel 200. The backlight unit 300 comprises light sources, i.e., LEDS, which are driven by the multi-channel LED constant current controlling apparatus 100, and uniformly irradiates light to the liquid crystal display panel 200. The backlight unit 300 may be implemented as a direct type backlight unit or an edge type backlight unit.

As described above, the multi-channel LED constant current controlling apparatus 100 can control the current flowing through multi-channel LED channels, and adjust the emitter resistance values in order to reduce the power consumption of the transistors. The controller 120 of the multi-channel LED constant current controlling apparatus 100 receives a dimming value from a local diming circuit (not shown) or the timing controller 230 having the local dimming circuit incorporated therein, and performs PWM (Pulse Width Modulation) of the DC-DC converter 12 in accordance with the dimming value to adjust the luminance of the backlight unit.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for controlling constant current for multi-channel LEDs, the apparatus comprising:
    a plurality of LED channels each comprising an LED array, a transistor, and a variable emitter resistor;
    a feedback sensing circuit for sensing the collector or drain voltage of a transistor of each of the LED channels; and
    a controller for increasing the variable emitter resistance of an LED channel in which the collector voltage of the transistor is higher than those of the other LED channels, in response to a feedback sensing result input from the feedback sensing circuit.

2. The apparatus of claim 1, wherein the variable emitter resistor comprises:
    first and second switching elements connected in parallel to an emitter terminal of the transistor;
    a first resistor connected between the first switching element and a ground voltage source; and
    a second resistor connected between the second switching element and the ground voltage source,
    wherein the controller controls the first and second switching elements to change the resistance value of the variable emitter resistor.

3. The apparatus of claim 1, wherein the controller increases the reference voltage of an LED channel in which the collector voltage of the transistor is higher than those of the other LED channels, in response to a feedback sensing result input from the feedback sensing circuit,
    wherein the reference voltage is for a comparator for controlling the transistor.

4. The apparatus of claim 2, wherein the controller turns on both of the first and second switching elements of an LED channel in which the collector voltage of the transistor is lower than those of the other LED channels, in response to a feedback sensing result input from the feedback sensing circuit, so that the first and second resistors are connected in parallel to the emitter terminal of the transistor.

5. The apparatus of claim 4, wherein the controller turns on either one of the first and second switching elements of an LED channel in which the collector voltage of the transistor is higher than those of the other LED channels, in response to a feedback sensing result input from the feedback sensing circuit, so that either one of the first and second resistors are connected in series to the emitter terminal of the transistor.

6. A liquid crystal display comprising:
    a liquid crystal display panel;
    a backlight unit for radiating light emitted from a plurality of LED channels to the liquid crystal display panel, each of the LED channels comprising an LED array, a transistor, and a variable emitter resistor; and
    a multi-channel LED constant current controlling apparatus for controlling the current of the LED channels, the apparatus comprising:
        a feedback sensing circuit for sensing the collector or drain voltage of a transistor of each of the LED channels; and
        a controller for increasing the variable emitter resistance of an LED channel in which the collector voltage of the transistor is higher than those of the other LED channels, in response to a feedback sensing result input from the feedback sensing circuit.

7. The liquid crystal display of claim 6, wherein the controller increases the reference voltage of an LED channel in which the collector voltage of the transistor is higher than those of the other LED channels, in response to a feedback sensing result input from the feedback sensing circuit,
    wherein the reference voltage is applied to a base terminal of the transistor.

8. The liquid crystal display of claim 6, wherein the variable emitter resistor comprises:
    first and second switching elements connected in parallel to an emitter terminal of the transistor;
    a first resistor connected between the first switching element and a ground voltage source; and
    a second resistor connected between the second switching element and the ground voltage source,
    wherein the controller controls the first and second switching elements to change the resistance value of the variable emitter resistor.

9. The liquid crystal display of claim 8, wherein the controller turns on both of the first and second switching elements of an LED channel in which the collector voltage of the transistor is lower than those of the other LED channels, in response to a feedback sensing result input from the feedback sensing circuit, so that the first and second resistors are connected in parallel to the emitter terminal of the transistor.

10. The liquid crystal display of claim 9, wherein the controller turns on either one of the first and second switching elements of an LED channel in which the collector voltage of the transistor is higher than those of the other LED channels, in response to a feedback sensing result input from the feedback sensing circuit, so that either one of the first and second resistors are connected in series to the emitter terminal of the transistor.

* * * * *